(12) United States Patent
Lee et al.

(10) Patent No.: US 7,381,033 B2
(45) Date of Patent: Jun. 3, 2008

(54) RECIPROCATING COMPRESSOR

(75) Inventors: Hyuk Lee, Gyeonggi-Do (KR);
Sang-Sub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 11/086,301

(22) Filed: Mar. 23, 2005

(65) Prior Publication Data

US 2006/0222532 A1 Oct. 5, 2006

(30) Foreign Application Priority Data

Dec. 22, 2004 (KR) ............... 10-2004-0110649

(51) Int. Cl.
F04B 35/04 (2006.01)
H02K 35/00 (2006.01)
H02K 1/18 (2006.01)

(52) U.S. Cl. .................. 417/417; 310/15; 310/218

(58) Field of Classification Search .......... 417/53, 417/416, 417, 902; 310/12–24, 216–218, 310/258, 259
See application file for complete search history.

(56) References Cited

U.S. PATENT DOCUMENTS

| | | | |
|---|---|---|---|
| 4,924,675 A * | 5/1990 | Higham et al. ............... 62/6 |
| 6,653,753 B1 * | 11/2003 | Kawano et al. .............. 310/14 |
| 6,755,627 B2 * | 6/2004 | Chang ...................... 417/417 |
| 6,793,470 B2 * | 9/2004 | Song et al. ................. 417/417 |
| 6,838,789 B2 * | 1/2005 | Kwon et al. ................. 310/12 |
| 6,860,725 B2 * | 3/2005 | Park et al. ................. 417/312 |
| 6,863,506 B2 * | 3/2005 | Park et al. ................. 417/360 |
| 2004/0208759 A1 | 10/2004 | Hong |
| 2005/0057101 A1 * | 3/2005 | Nakagawa et al. ........... 310/12 |
| 2005/0173995 A1 * | 8/2005 | Lee et al. ................... 310/15 |
| 2005/0260083 A1 * | 11/2005 | Park, II .................... 417/415 |

FOREIGN PATENT DOCUMENTS

| | | |
|---|---|---|
| CN | 1077253 A | 10/1993 |
| CN | 1443279 A | 9/2003 |
| CN | 1514909 A | 7/2004 |
| KR | 2003-0048643 A | 6/2003 |
| KR | 2003-0065836 A | 8/2003 |
| WO | WO-02/082624 A2 | 10/2002 |
| WO | WO-03/054390 A1 | 7/2003 |
| WO | WO-2004/057188 A1 | 7/2004 |
| WO | WO-2004/081378 A2 | 9/2004 |

* cited by examiner

*Primary Examiner*—Charles G Freay
(74) *Attorney, Agent, or Firm*—Birch, Stewart, Kolasch & Birch, LLP (57) ABSTRACT

A reciprocating compressor includes a front frame; a middle frame positioned with an interval from the front frame; an outer stator having a winding coil and coupled between the front frame and the middle frame; a cylinder coupled to the front frame; a magnet mounting inner stator having a protruded pole portion at both ends thereof and linear-movably inserted into the outer stator; a magnet mounted at an outer circumferential surface of the magnet mounting inner stator; a piston inserted into the cylinder; a connection unit for connecting the piston and the magnet mounting inner stator; a resonance spring unit for resonating the piston and the magnet mounting inner stator; and a valve assembly for opening and closing a gas flow path so that gas can be sucked into the cylinder and compressed as the piston is linearly-reciprocated. According, the amount of the expensive magnet used is reduced, an output of a driving motor is enhanced, and components are simplified.

17 Claims, 5 Drawing Sheets

RECIPROCATING COMPRESSOR

BACKGROUND OF THE INVENTION

1. Field of the Invention

The present invention relates to a reciprocating compressor, and more particularly, to a reciprocating compressor capable of reducing a usage amount of an expensive magnet, enhancing an output of a driving motor, and simplifying components.

2. Description of the Conventional Art

Generally, a reciprocating compressor is a device for sucking refrigerant gas and compressing the refrigerant gas as a piston is linearly-reciprocated in a cylinder. The reciprocating compressor is largely divided into two by a driving mechanism. One is for converting a rotary motion of a motor into a linear reciprocation and then transmitting the converted linear reciprocation to a piston, and another is for directly transmitting a linear reciprocation of a motor to a piston.

Figure 1:
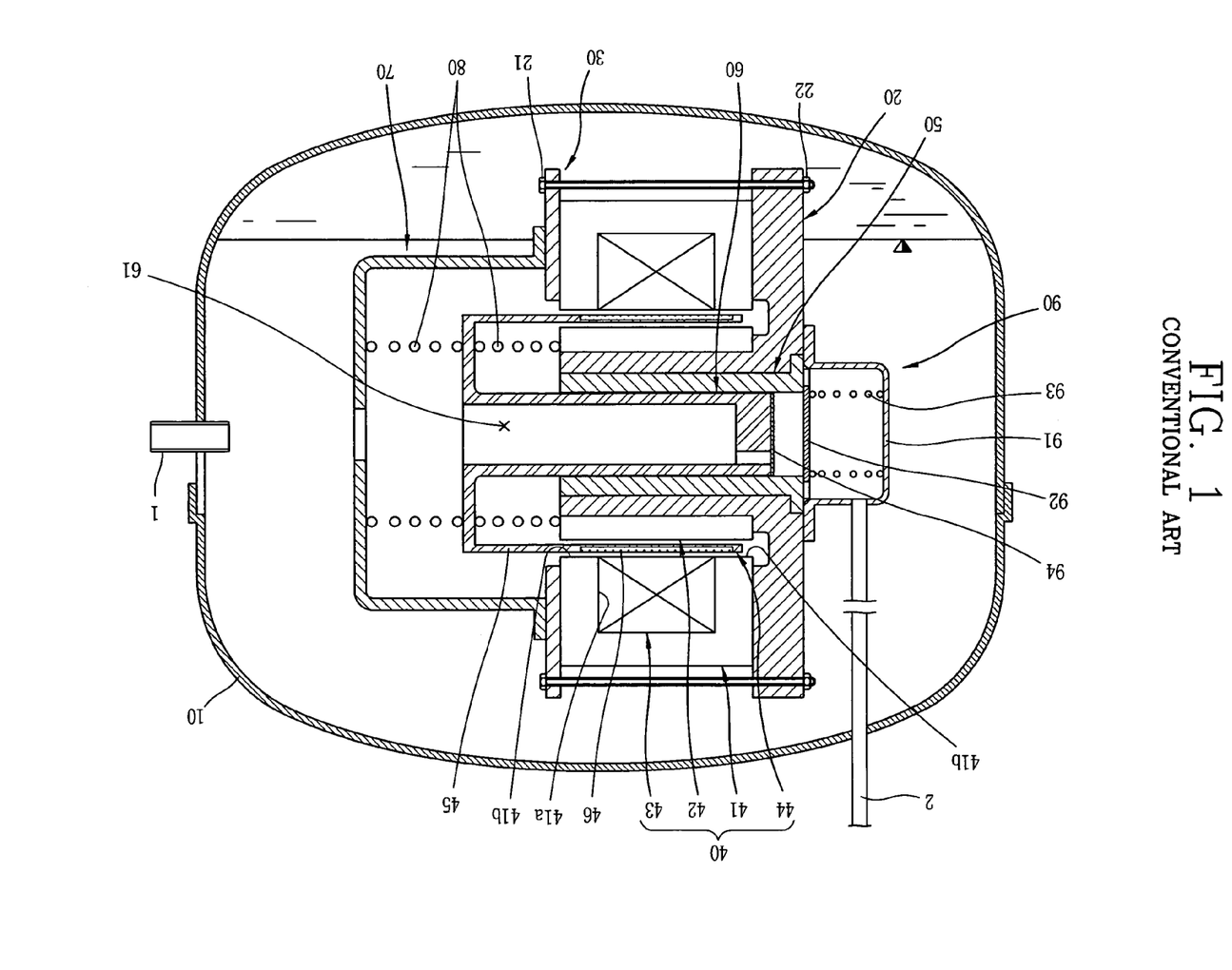
FIG. 1 is a sectional view showing a reciprocating compressor in accordance with the conventional art.

FIG. 1 shows one example of a reciprocating compressor in which a linear reciprocation of a motor is directly transmitted to a piston. As shown, the reciprocating compressor comprises: a casing 10 to which a gas suction pipe 1 and a gas discharge pipe 2 are coupled; a front frame 20 and a middle frame 30 elastically supported in the casing 10 with a certain interval; a driving motor 40 mounted between the front frame 20 and the middle frame 30, for generating a driving force; a cylinder 50 inserted into the front frame 20; a piston 60 linearly-reciprocated in the cylinder 50 by receiving a driving force of the driving motor 40; a rear frame 70 covering the piston 60; a resonance spring 80 for inducing a resonance by elastically supporting the piston 60; and a valve assembly 90 for opening and closing a gas flow path so that gas can be sucked into the cylinder 50 and compressed as the piston 60 is linearly-reciprocated.

The driving motor 40 includes: an outer stator 41 mounted between the front frame 20 and the middle frame 30; an inner stator 42 inserted into the outer stator 41 with a certain interval thereby to be mounted at the front frame 20; a winding coil 43 coupled to the outer stator 41; and a mover 44 linear-movably inserted between the outer stator 41 and the inner stator 42.

The mover 44 is composed of a cylindrical holder 45, and a plurality of magnets 46 coupled to the holder 45. The holder 45 is connected to the piston 60.

The outer stator 41 is formed as a cylindrical shape having a certain length, and an opening groove 41a at which the winding coil 43 is positioned is formed at an inner circumferential surface of the outer stator 41. A pole portion 41b is formed at both sides of the opening groove 41a.

The inner stator 42 is formed as a cylindrical shape having a certain length, and a sectional surface of one side thereof has a square shape.

The outer stator 41 and the inner stator 42 are formed as a plurality of lamination sheets having a certain shape are stacked.

Figure 2:
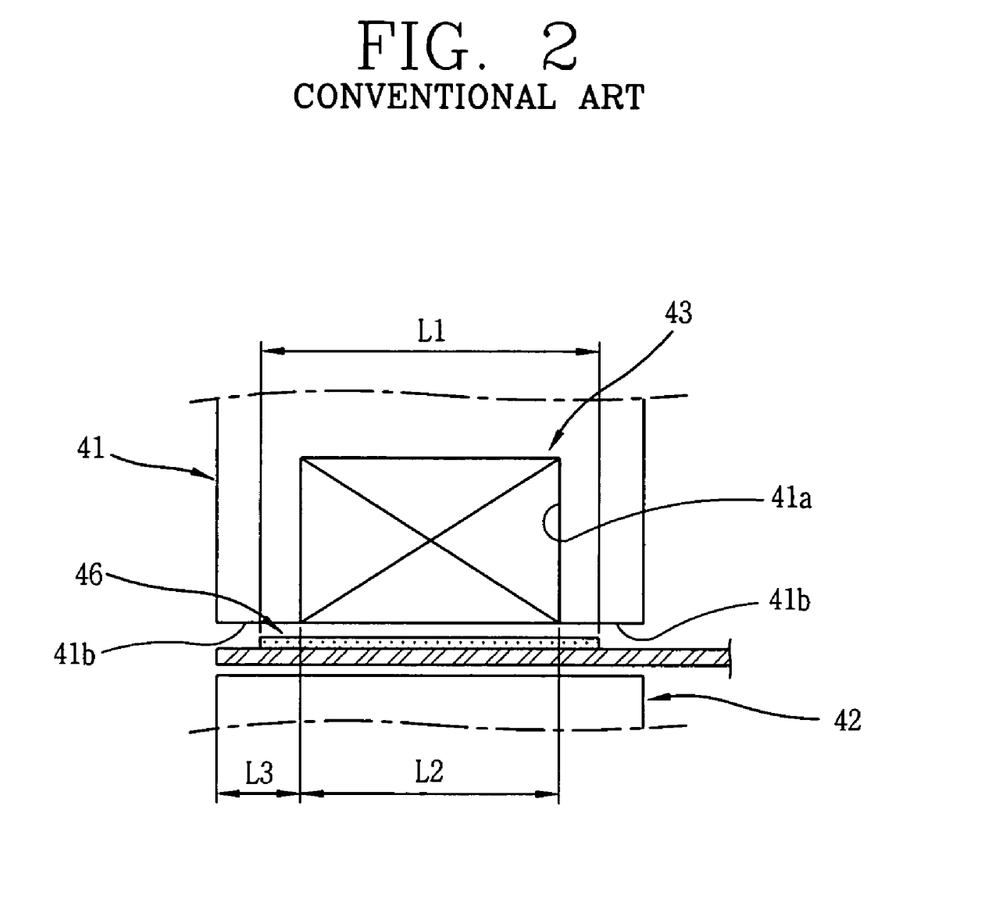
FIG. 2 is a sectional view showing a part of a driving motor constituting the reciprocating compressor in accordance with the conventional art.

As shown in FIG. 2, a length L1 of the magnet 46 in an axial direction is the sum of a length L2 of the opening groove 41a of the outer stator and a length L3 of one pole portion. Under a state that the magnet 46 is coupled to the holder 45, both ends of the magnet 46 are respectively positioned at the middle part of the pole portion 41b.

The valve assembly 90 is composed of: a discharge cover 91 coupled to the front frame 20, for covering one side of the cylinder 50; a discharge valve 92 positioned in the discharge cover 91, for opening/closing one side of the cylinder 50; a valve spring 93 positioned in the discharge cover 91, for elastically supporting the discharge valve 92; and a suction valve 94 coupled to an end portion of the piston 60, for opening and closing an inner flow path 61 penetratingly formed in the piston 60.

An unexplained reference numeral 21 denotes a coupling bolt, and 22 to denotes a nut.

An operation of the reciprocating compressor will be explained as follows.

First, when power is supplied to the driving motor 40, a current flows on the winding coil 43 of the driving motor 40. By the current, a flux is formed at the outer stator 41 and the inner stator 42. By an interaction between the generated flux and a flux formed by the magnet 46 of the mover 44, the mover 44 is linearly-reciprocated and thereby the piston 60 connected to the mover 44 is linearly-reciprocated in the cylinder 50.

As the piston 60 is linearly reciprocated in the cylinder 50, a pressure difference is generated in the cylinder 50. By the pressure difference inside the cylinder 50, the suction valve 94 and the discharge valve 92 constituting the valve assembly 90 open and close the gas flow path thereby to suck gas into the cylinder 50, compress the gas, and discharge the gas. While the above processes are repeated, sucked gas is continuously compressed.

In order to enhance a price competitiveness of a compressor, components and fabrication processes have to be simplified. Also, in order to minimize a consumption power, an output of a driving motor has to be maximized.

However, in the conventional reciprocating compressor, the magnets 46 are positioned at the air gap between the outer stator 41 and the inner stator 42 under a state of being mounted on the holder 45. According to this, the holder 45 for fixing the magnets 46 is required thus to have complicated components and to increase a fabrication cost of the holder 45. Also, since the holder 45 is used, the air gap between the outer stator 41 and the inner stator 42 becomes relatively large thereby to generate a motor loss.

Also, since both ends of the magnet 46 are respectively positioned at the middle part of the pole portion 41b of the outer stator, the length L1 of the magnet 46 becomes relatively long and thereby a usage amount of the magnets 46 mounted at the holder 45 is excessively increased. As the magnet 46 is very expensive, the entire fabrication cost is increased.

SUMMARY OF THE INVENTION

Therefore, an object of the present invention is to provide a reciprocating compressor capable of reducing a usage amount of an expensive magnet and capable of enhancing an output of a driving motor.

Another object of the present invention is to provide a reciprocating compressor capable of simplifying components.

To achieve these and other advantages and in accordance with the purpose of the present invention, as embodied and broadly described herein, there is provided a reciprocating compressor comprising: a front frame positioned in a casing; a middle frame positioned in the casing with a certain interval from the front frame; an outer stator having a winding coil and coupled between the front frame and the middle frame; a cylinder coupled to the front frame; a magnet mounting inner stator having a protruded pole portion at both ends thereof and linear-movably inserted into the outer stator; a magnet mounted at an outer circumferential surface of the magnet mounting inner stator; a piston inserted into the cylinder; a connection unit for connecting the piston and the magnet mounting inner stator; a resonance spring unit for resonating the piston and the magnet mounting inner stator; and a valve assembly for opening and closing a gas flow path so that gas can be sucked into the cylinder and compressed as the piston is linearly-reciprocated.

The foregoing and other objects, features, aspects and advantages of the present invention will become more apparent from the following detailed description, of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a reciprocating compressor according to the present invention will be explained with reference to the attached drawings as follows.

Figure 3:
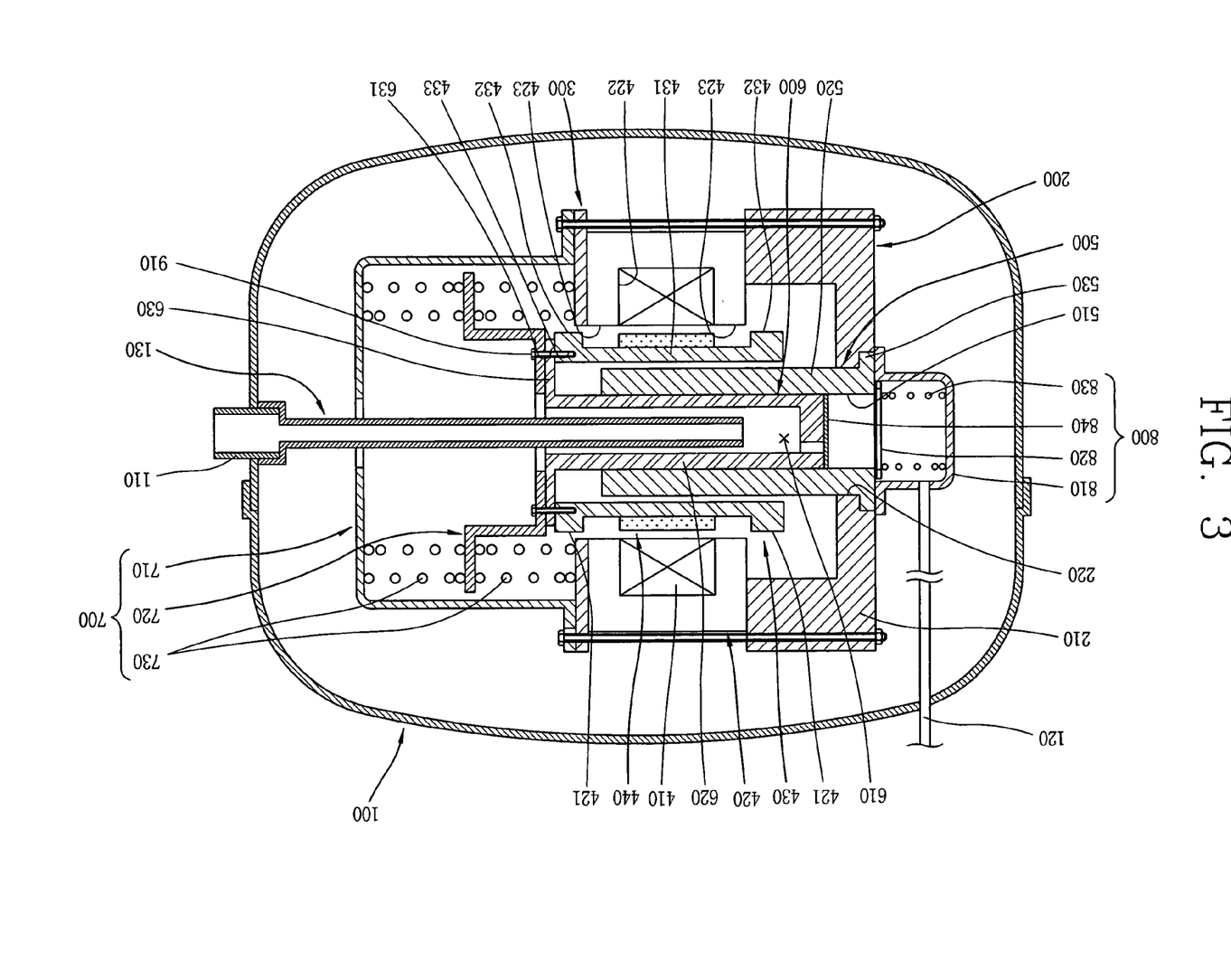
FIG. 3 is a sectional view showing one embodiment of a reciprocating compressor according to the present invention.

FIG. 3 is a sectional view showing one embodiment of a reciprocating compressor according to the present invention.

As shown, the reciprocating compressor according to the present invention, comprises: a front frame 200 positioned in a casing 100; a middle frame 300 positioned in the casing 100 with a certain interval from the front frame 200; an outer stator 420 having a winding coil 410 and coupled between the front frame 200 and the middle frame 300; a cylinder 500 coupled to the front frame 200; a magnet mounting inner stator 430 having a protruded pole portion 421 at both ends thereof and linear-movably inserted into the outer stator 420; a magnet 440 mounted at an outer circumferential surface of the magnet mounting inner stator 430; a piston 600 inserted into the cylinder 500; a connection unit (e.g., a plurality of bolts 910 of the illustrated embodiment as shown in FIG. 3) for connecting the piston 600 and the magnet mounting inner stator 430; a resonance spring unit 700 for resonating the piston 600 and the magnet mounting inner stator 430; and a valve assembly 800 for opening and closing a gas flow path so that gas can be sucked into the cylinder 500 and compressed as the piston 600 is linearly-reciprocated.

The casing 100 is formed to have a certain inner space, and a gas suction pipe 110 and a gas discharge pipe 120 are coupled to one side of the casing 100.

The front frame 200 is composed of a body 210 having an inner space of a certain shape therein; and a cylinder insertion hole 220 penetratingly formed at a center portion of the body 210.

The middle frame 300 is formed to have a shape corresponding to that of the front frame 200 and a certain thickness.

The outer stator 420 is formed as a cylindrical shape having a certain length, and a ring-shaped opening groove 422 at which the winding coil 410 is positioned is formed at an inner circumferential surface of the outer stator 420. A pole portion 423 is formed at both sides of the opening groove 422.

The inner stator 430 is preferably formed as a lamination body that a plurality of thin sheets having a certain shape are stacked in a circumferential direction.

As another embodiment, the outer stator 420 is formed as a plurality of lamination blocks, each lamination block being formed as a plurality of thin sheets having a certain shape are stacked, are coupled to the winding coil 410 in the circumferential direction.

The outer stator 420 is positioned, between the front frame 200 and the middle frame 300. The front frame 200, the outer stator 420, and the middle frame 300 are fixedly coupled by a plurality of coupling bolts and nuts (not shown).

The magnet mounting inner stator 430 is composed of: a cylindrical portion 431 formed as a cylindrical shape having a certain length; and pole portions 432 respectively extended from outer circumferential surfaces of both ends of the cylindrical portion 431 with a certain width and a height. Preferably, a distance between an inner side surface of one pole portion 432 and an inner side surface of another pole portion 432 is formed to be almost equal to the length of the outer stator 420. An outer diameter of the pole portion 432 is formed to be smaller than an inner diameter of the outer stator 420. A sectional surface of the is pole portion 432 has a square shape.

Figure 4:
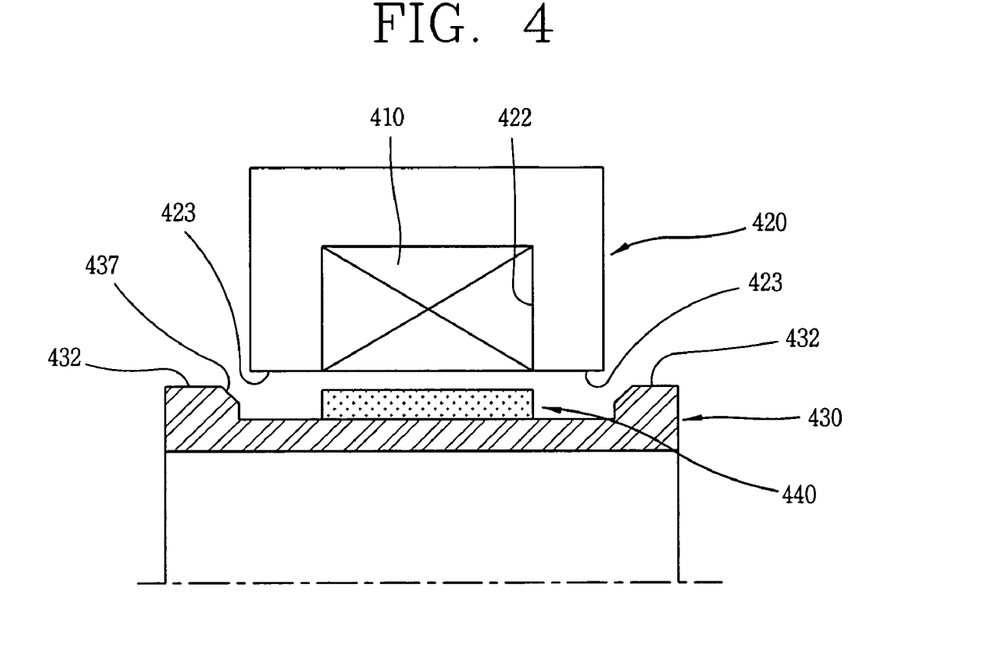
FIG. 4 is a perspective view showing a part of a driving motor constituting the reciprocating compressor according to the present invention.

As another modification example of the pole portion 432, as shown in FIG. 4, an inclination surface 437 inclined as a certain inclination angle is provided at an inner edge of the square pole portion 432.

The magnet mounting inner stator 430 is a soft magnetic composite (SMC) formed as magnetic powder is molded by a sintering method.

As a modification example of the magnet mounting inner stator 430, the magnet mounting inner stator 430 can be a lamination body that a plurality of thin sheets having a certain shape are stacked in a circumferential direction.

The magnet 440 is formed to have a certain thickness and an area. A length of the magnet 440 in an axial direction is formed to be smaller or equal than or to a length of the opening groove 422 of the outer stator in an axial direction or a length of the winding coil 410 in an axial direction. A plurality of the magnets 440 are coupled to an outer circumferential surface of the magnet mounting inner stator 430 with a certain interval. The magnets 440 are coupled to the magnet mounting inner stator 430 so as to be positioned at a middle portion of an outer circumferential surface of the cylindrical portion 431 positioned between the pole portions 432. A thickness of the magnet 440 is formed to be equal or less to or than a height of the pole portion 432.

The magnet mounting inner stator 430 to which the magnet 440 is coupled is movably inserted into the outer stator 420.

The winding coil 410, the outer stator 420, the magnet 440, and the magnet mounting inner stator 430 constitute a driving motor.

The cylinder 500 is composed of: a cylindrical portion 520 having a through hole 510 therein; and a flange portion 530 extended from an outer circumferential surface of the cylindrical portion 520 as a ring shape, having a certain thickness. The cylindrical portion 520 is penetratingly inserted into the cylinder insertion hole 220 of the front frame and the magnet mounting inner stator 430, and the flange portion 530 is coupled to the front frame 200, thereby coupling the cylinder 500 to the front frame 200.

The magnet mounting inner stator 430 is positioned between an outer circumferential surface of the cylinder 500 and an inner circumferential surface of the outer stator 420.

The piston 600 is composed of: a cylindrical body 620 having a through flow path 610 therein; and a flange portion 630 extended from one end portion of the cylindrical body 620 as a ring shape having a certain thickness. The cylindrical body 620 is inserted into the through hole 510 of the cylinder and the flange portion 630 is in contact with a lateral surface of the magnet mounting inner stator 430, thereby coupling the piston 600 to the cylinder 500.

The piston 600 and the magnet mounting inner stator 430 are coupled to each other by the connection unit.

The connection unit is composed of a plurality of coupling bolts 910. A plurality of through holes 631 are formed at the flange portion 630 of the piston with a certain interval, and a plurality of female screw holes 433 corresponding to the through holes 631 of the flange portion 630 are formed at a lateral surface of the magnet mounting inner stator 430. As the coupling bolts 910 are coupled to the through holes 631 of the flange portion of the piston and the female screw holes 433 of the magnet mounting inner stator, the piston 600 is coupled to the magnet mounting inner stator 430.

Figure 5:
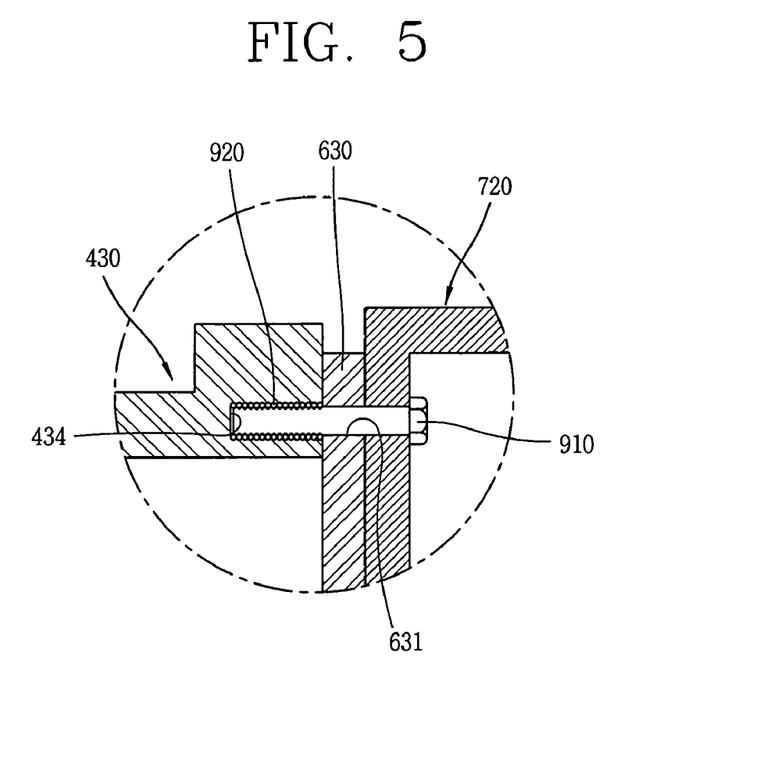
FIG. 5 is a sectional view showing a modification example of a connection unit constituting the reciprocating compressor according to the present invention.

As a modification example of the connection unit, as shown in FIG. 5, a is plurality of holes 434 having a certain depth and an inner diameter are formed at one side surface of the magnet mounting inner stator 430, and a helical spring 920 is respectively fixedly coupled to the holes 434. As the plural coupling bolts 910 are coupled to the through holes 631 of the flange portion of the piston and the helical spring 920 coupled to the holes 434 of the magnet mounting inner stator, the piston 600 and the magnet mounting inner stator 430 are coupled to each other.

Figure 6:
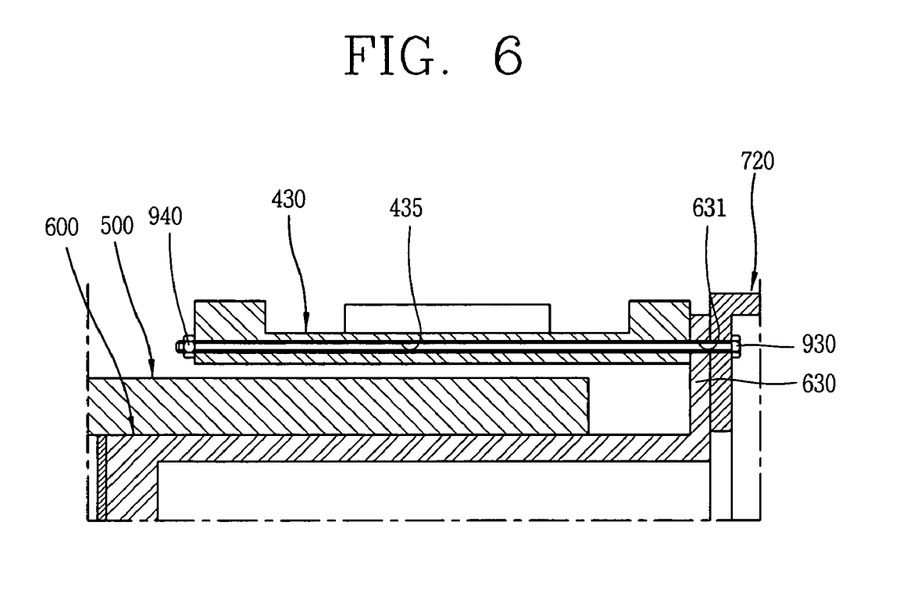
FIG. 6 is a sectional view showing another modification example of the connection unit constituting the reciprocating compressor according to the present invention.

As another modification example of the connection unit, as shown in FIG. 6, a plurality of through holes 435 are formed at the magnet mounting inner stator 430 in a longitudinal direction. A plurality of coupling bolts 930 are penetratingly inserted into the through holes 631 of the flange portion of the piston and the through holes 435 of the magnet mounting inner stator, and nuts 940 are coupled to screw portions of the coupling bolts 930, thereby coupling the piston 600 and the magnet mounting inner stator 430 each other.

The resonance spring unit 700 is composed of: a rear frame 710 coupled to the middle frame 300; a spring supporting plate 720 coupled to the piston 600; and a resonance spring 730 respectively positioned at both sides of the spring supporting plate 720, for elastically supporting the spring supporting plate 720.

The rear frame 710 is formed to have a certain inner space. The rear frame 710 is preferably coupled to the middle frame 300 by the coupling bolts 910 and 930 for coupling the middle frame 300, the outer stator 420, and the front frame 200.

The spring supporting plate 720 is provided with a curved portion, and is fixedly coupled to the flange portion 630 of the piston by the connection unit.

The resonance spring 730 is a coil compression spring. One side of the resonance spring 730 is contact-supported by one surface of the spring supporting plate 720, and another side of the resonance spring 730 is contact-supported by an inner side surface of the rear frame 710. According to this, the resonance spring 730 is coupled between the spring supporting plate 720 and the middle frame 300.

The spring supporting plate 720 can be coupled by the coupling bolts 910 and 930, the connection unit, so as to be positioned between the flange portion 630 of the piston and the magnet mounting inner stator 430.

A gas suction guiding pipe 130 for guiding a suction of gas is provided in a through flow path 610 of the piston. The gas suction guiding pipe 130 is coupled to an inner surface of the casing 100 or the gas suction pipe 110 so as to be connected to the gas suction pipe 110 coupled to the casing 100.

The valve assembly 800 is composed of a discharge cover 810 coupled to the front frame 200, for covering one side of the cylinder 500; a discharge valve 820 positioned in the discharge cover 810, for opening/closing one side of the cylinder 500; a valve spring 830 positioned in the discharge cover 810, for elastically supporting the discharge valve 820; and a suction valve 840 coupled to an end portion of the piston 600, for opening and closing an inner flow path penetratingly formed in the piston 600.

The discharge cover 810 is connected to the gas discharge pipe 120 coupled to the casing 100 by an additional loop pipe.

Hereinafter, effects of the reciprocating compressor according to the present invention will be explained as follows.

First, when power is supplied to the driving motor 40, a current flows on the winding coil 410 of the driving motor 40. By the current, a flux is formed at the outer stator 420 and the magnet mounting inner stator 430. By an interaction between the generated flux and a flux formed at the pole portion 432 of the magnet mounting inner stator, the magnet mounting inner stator 430 at which the magnet 440 is mounted is linearly-reciprocated.

The above process will be explained in more detail as follows.

Figure 7:
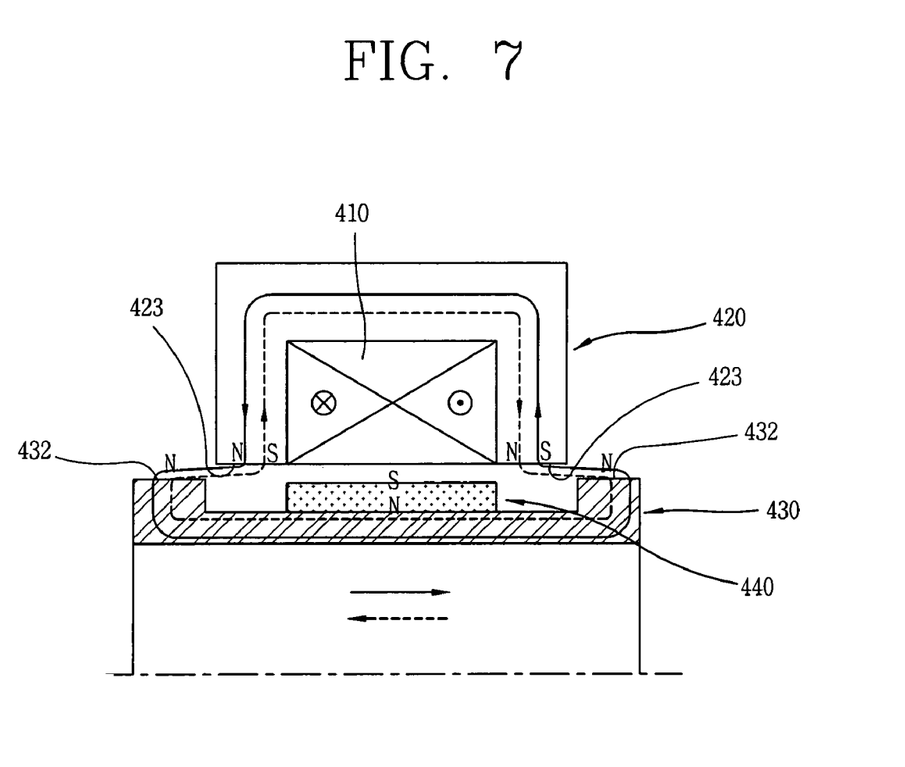
FIG. 7 is a sectional view showing an operation state of the driving motor constituting the reciprocating compressor according to the present invention.

As shown in FIG. 7, when N and S poles of the magnet 440 are magnetized, a flux is generated by the magnet 440 and thereby the N pole is respectively formed at the pole portion 432 of the magnet mounting inner stator. When a direction of the current flowing on the winding coil 410 is alternately changed, N and S poles are alternately formed at the pole portion 432 of the magnet mounting inner stator. At this time, if the N pole is formed at the left pole portion 423 of the outer stator and the S pole is formed at the right pole portion 423 of the outer stator, an attractive force is applied between the right pole portion 432 of the magnet mounting inner stator 430 and the right pole portion 423 of the outer stator, and a repulsive force is applied between the left pole portion 432 of the magnet mounting inner stator 430 and the left pole portion 423 of the outer stator. According to this, the magnet mounting inner stator 430 is moved towards the left direction.

On the contrary, if the S pole is formed at the left pole portion 423 of the outer stator and the N pole is formed at the right pole portion 423 of the outer stator, the magnet mounting inner stator 430 is moved towards the right direction.

As the magnet mounting inner stator 430 is linearly reciprocated, the piston 600 coupled to the magnet: mounting inner stator 430 is linearly reciprocated in the cylinder 500.

As the piston 600 is linearly reciprocated in the cylinder 500, a pressure difference is generated in the cylinder 500. By the pressure difference inside the cylinder 500, the suction valve 840 and the discharge valve 820 constituting the valve assembly 800 open and close the gas flow path thereby to suck gas into the cylinder 500, compress the gas, and discharge the gas. While the above processes are repeated, sucked gas is continuously-compressed.

The magnet mounting inner stator 430 and the piston 600 continuously maintain a resonant motion by the resonance spring unit 700.

Gas is sucked into the cylinder 500 through the gas suction pipe 110 and the gas suction guiding pipe 130, and gas is discharged from the cylinder 500. Then, the gas is discharged to outside of the casing 100 through the discharge cover 810 and the gas discharge pipe 120. Since a suction of gas is guided by the gas suction guiding pipe 130, sucked gas is prevented from being heated by heating gas inside the casing 100.

In the present invention, a reciprocating driving force is generated by a flux concentratingly formed at the pole portions 432 protruded at the magnet mounting inner stator 430 and by a flux concentratingly formed at the pole portions 423 of the outer stator, and thereby the reciprocating driving force is great. That is, not only a flux generated from the magnet 440 is concentrated on the pole portions 432 of the magnet mounting inner stator, but also a flux generated by the current flowing on the winding coil 410 is concentrated on the pole portions 432 of the magnet mounting inner stator and the pole portions 423 of the outer stator, thereby generating a great driving force. According to this, the length of the magnet 440 can become shorter than that of the conventional magnet, thereby reducing a usage amount of the magnet 440.

As the magnet 440, cheap ferrite having a low magnetic flux density can be used.

Since the magnet 440 is coupled to the magnet mounting inner stator 430 and the magnet mounting inner stator 430 is directly reciprocated, an air gap between the outer stator 420 and the magnet mounting inner stator 430 is minimized. Also, since the magnet mounting inner stator 430 is directly moved, a moving mass is relatively great thereby to stabilize the system much more.

Also, since the magnet 440 is directly coupled to the magnet mounting inner stator 430, the conventional holder 45 for mounting the magnet 46 is not required thereby to reduce the number of components. Since the holder 45 is positioned between the inner stator 42 and the outer stator 41 and the magnet 440 is coupled to the outer circumferential surface of the holder 45, the structure is complicated and the fabrication is very difficult. If the holder 45 is not used, the fabrication cost is greatly reduced.

As aforementioned, in the reciprocating compressor according to the present invention, an output of the driving motor is enhanced and thereby a compression efficiency for compressing gas by receiving the driving force is enhanced. Also, as the output of the driving motor is enhanced, a usage amount of the magnet is relatively decreased and thereby the fabrication cost can be reduced.

Additionally, since the number of components is reduced, a processing cost is reduced and the number of assembly processes is reduced. According to this, the fabrication cost is much more reduced and the assembly productivity is enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A reciprocating compressor comprising:
   a front frame;
   a middle frame having an interval from the front frame;
   an outer stator having a winding coil and coupled between the front frame and the middle frame;
   a cylinder coupled to the front frame;
   a magnet mounting inner stator having a main body and a protruded pole portion at both ends of the main body, the magnet mounting inner stator being linear-movably inserted into the outer stator, the main body and the protruded pole portions being made of a same material;
   a magnet mounted at an outer circumferential surface of the magnet body and inside a recess between the protruded pole portions, the magnet having a thickness substantially equal to or less than a depth of the recess;
   a piston inserted into the cylinder;
   a connection unit for connecting the piston and the magnet mounting inner stator;
   a resonance spring unit for resonating the piston and the magnet mounting inner stator; and
   a valve assembly for opening and closing a gas flow path so that gas can be sucked into the cylinder and compressed as the piston is linearly-reciprocated.

2. The reciprocating compressor of claim 1, wherein a sectional, surface of the protruded pole portion has a square shape.

3. The reciprocating compressor of claim 2, wherein an inclination surface inclined at an acute angle is provided at an inner edge of the protruded pole portion.

4. The reciprocating compressor of claim 1, wherein a length of the magnet in an axial direction is shorter than a length of the winding coil in an axial direction.

5. The reciprocating compressor of claim 1, wherein the magnet mounting inner stator is formed as a plurality of thin sheets are stacked.

6. The reciprocating compressor of claim 1, wherein the magnet mounting inner stator is a soft magnetic composite formed as magnetic powder is molded by a sintering method.

7. The reciprocating compressor of claim 1, wherein one side of the cylinder is positioned in the outer stator, and the magnet mounting inner stator is inserted between an outer circumferential surface of the cylinder and an inner circumferential surface of the outer stator.

8. The reciprocating compressor of claim 1, wherein the connection unit is a plurality of coupling bolts.

9. The reciprocating compressor of claim 1, wherein the connection unit penetrates through the piston into the magnet mounting inner stator.

10. The reciprocating compressor of claim 9, wherein the resonance spring unit includes a helical spring.

11. The reciprocating compressor of claim 1, wherein a through flow path for flowing gas is formed in the piston, and a gas suction guiding pipe for guiding a suction of gas is provided in the through flow path of the piston.

12. The reciprocating compressor of claim 9, wherein the piston has a cylindrical body and a flange extending from the cylindrical body, the connection unit penetrates through the flange of the piston.

13. The reciprocating compressor of claim 12, wherein the flange extends from a bottom end of the cylindrical body.

14. The reciprocating compressor of claim 12, wherein the resonance spring unit has a spring supporting plate, and the flange is between and in contact with the spring supporting plate and one of the protruded pole portions.

15. The reciprocating compressor of claim 12, wherein the connection unit penetrates through the spring supporting plate and the piston into the magnet mounting inner stator.

16. A reciprocating compressor comprising:
   a front frame;
   a middle frame having an interval from the front frame;
   an outer stator having a winding coil and coupled between the front frame and the middle frame;
   a cylinder coupled to the front frame;
   a magnet mounting inner stator having a protruded pole portion at both ends thereof and linear-movably inserted into the outer stator;
   a magnet mounted at an outer circumferential surface of the maget mounting inner stator;
   a piston inserted into the cylinder;
   a connection unit for connecting the piston and the magnet mounting inner stator;
   a resonance spring unit for resonating the piston and the magnet mounting inner stator; and
   a valve assembly for opening and closing a gas flow path so that gas can be sucked into the cylinder and compressed as the piston is linearly-reciprocated,
   wherein a distance between an inner side surface of one of the protruded pole portions and an inner side surface of another one of the protruded pole portions corresponds to a length of the outer stator.

17. A reciprocating compressor comprising:
   a front frame;
   a middle frame having an interval from the front frame;
   an outer stator having a winding coil and coupled between the front frame and the middle frame;
   a cylinder coupled to the front frame;
   a magnet mounting inner stator having a protruded pole portion at both ends thereof and linear-movably inserted into the outer stator;
   a magnet mounted at an outer circumferential surface of the magnet mounting inner stator;
   a piston inserted into the cylinder;
   a connection unit for connecting the piston and the magnet mounting inner stator;
   a resonance spring unit for resonating the piston and the maget mounting inner stator; and
   a valve assembly for opening and closing a gas flow path so that gas can be sucked into the cylinder and compressed as the piston is linearly-reciprocated,
   wherein the connection unit includes a plurality of coupling bolts that penetrate the piston and the magnet mounting inner stator and a plurality of nuts respectively coupled to the coupling bolts.

* * * * *